Figure 4:
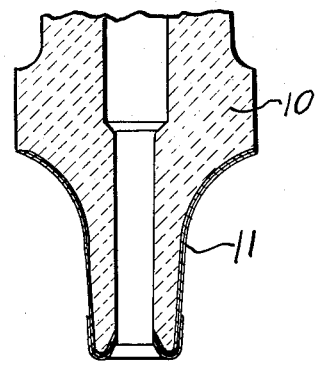

June 5, 1956 H. G. SCHURECHT 2,749,246
SPARK PLUG INSULATOR CONTAINING CERIC OXIDE
Filed Oct. 26, 1951 2 Sheets-Sheet 1
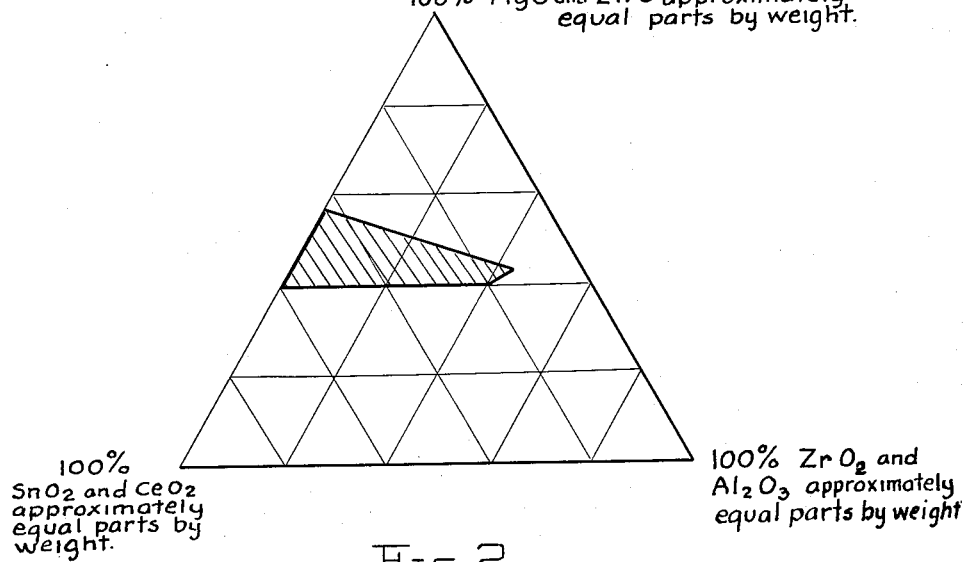
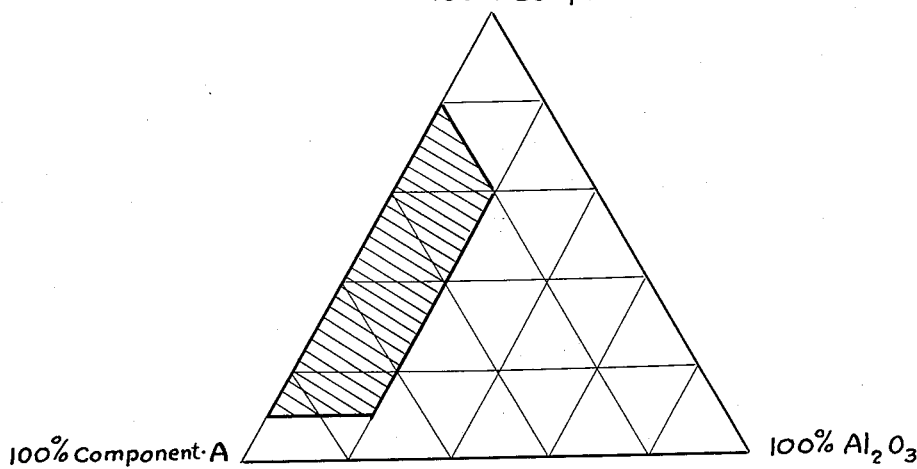
INVENTOR.
Harry G. Schurecht
BY
Owen & Owen
ATTORNEYS 100% of a mixture of from 95 to 97% BeO Balance one or more of the following - MgO, CaO, SrO and BaO.

INVENTOR.
Harry G. Schurecht
BY
Owen & Owen
ATTORNEYS

United States Patent Office 2,749,246
Patented June 5, 1956

2,749,246

SPARK PLUG INSULATOR CONTAINING CERIC OXIDE

Harry G. Schurecht, Detroit, Mich., assignor to Champion Spark Plug Company, Toledo, Ohio, a corporation of Delaware Application October 26, 1951, Serial No. 253,390

3 Claims. (Cl. 106—63)

This invention relates to a ceramic spark plug insulator sintered from a blend of refractory materials comprising substantial amounts of ceric oxide and of at least one other metal oxide.

Ceric oxide has heretofore been employed as an ingredient of spark plug insulators sintered from a blend in which alumina is a substantial portion of the entire composition. While the proportions of ceric oxide and alumina have been indefinitely stated it can be inferred that 20 to 30 per cent of the former is the maximum; such an inference is in accord with present knowledge, as a cylindrical insulator of ½ inch diameter and ½ inch length produced from 70 per cent of alumina and 30 per cent of ceric oxide has a resistance of 30 megohms at 1100° F. and 100 megohms at 900° F. when fired to cone 16 (2642° F.), and 30 megohms at 100° F. and 100 megohms at 900° F. when fired to cone 31 (3056° F.): approximately the minimum suitable for spark plug use. The resistance of insulators containing a larger proportion of ceric oxide to alumina is less than this minimum.

The present invention is based upon the discovery that sintered spark plug insulators having outstanding properties, particularly, excellent hot dielectric characteristics, and, in some instances, high thermal conductivity, can be produced by sintering a blend of refractory materials consisting of ceric oxide and certain other components, the permissible ceric oxide being greater than the prior art would indicate. Where relatively small quantities of ceric oxide are used the insulators of the present invention show substantially better thermal and electrical properties.

Figure 3:
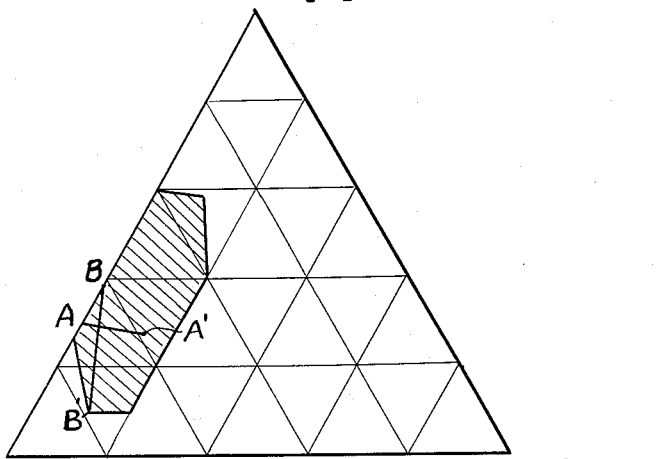

In the drawings, Fig. 1 is a triangular coordinate composition diagram whose shaded area shows the compositions of blends of refractory materials from which ceramic insulators of the invention containing zinc oxide, alumina, magnesia, zirconia, and tin oxide with ceric oxide can be produced by sintering;

Fig. 2 is a composition diagram given by triangular coordinates whose shaded area shows the general range of proportions in which the components thereof can be blended for the sintering of spark plug insulators according to the present invention;

Fig. 3 is a triangular coordinate composition diagram whose shaded area shows the general range of proportions in which beryllia (plus minor amounts of magnesia, calcium oxide, strontium oxide or barium oxide), ceric oxide and alumina can be blended prior to sintering to produce preferred spark plug insulators of the invention; and Fig. 4 is a sintered spark plug insulator having the surface which is exposed in the combustion chamber during use coated with a thin layer of a fused composition of the invention.

According to the present invention sintered ceramic spark plug insulators of high thermal conductivity and excellent high temperature electrical insulating properties are provided. Spark plug insulators of the invention are produced by sintering a blend of refractory materials composed essentially of three components, as follows: from 20 to 90 per cent of a component A, from 10 to 80 per cent of a component B, and from a trace to not more than about 20 per cent of alumina. (The terms "per cent" and "parts," as used herein and in the appended claims, refer to per cent and parts by weight, unless otherwise indicated.)

Component A consists of one or more oxides of beryllium, magnesium, cadmium, calcium, strontium, and barium. In no case does an oxide of any of the three last-named metals constitute more than 20 per cent of the blend.

Component B consists of one or more of the oxides of silicon, titanium, germanium, zirconium, tin, cerium, and thorium, and in accordance with the present invention at least 50 per cent of component B is $CeO_2$, and $CeO_2$ constitutes at least 20 per cent of every blend containing not over 80 per cent of BeO. In no case does $SiO_2$ constitute more than 10 per cent of the blend.

Zinc oxide is used to produce insulators of the invention in blends whose compositions are represented by the shaded area of Fig. 1, as it is satisfactory only in such proportions.

Referring to Fig. 2, the shaded area thereof shows the proportions of component A, component B and alumina used to produce insulators within the scope of the invention.

A preferred insulator of the invention is produced when component A consists of at least 50 per cent of beryllia. Such an insulator has extremely high heat conductivity, and excellent hot dielectric characteristics. The heat conductivity of insulators fired from beryllium oxide alone is very high compared with that of insulators from most other oxides, including ceric oxide. It has been found, however, that insulators containing substantial amounts of ceric oxide, along with beryllium oxide (e. g., as much as four parts of the former per part of the latter) have a thermal conductivity not substantially below that of insulators made substantially from beryllium oxide alone. Referring to Fig. 3, the shaded area on the triangular coordinate composition diagram shows the proportions of alumina, $CeO_2$ and a mixture of from 95 to 97 per cent BeO, balance one or more of the following: MgO, CaO, SrO and BaO, and from which insulators result having extremely high thermal conductivity (less than 10 seconds by the test hereinafter described) and sufficiently high electrical resistance at elevated temperatures (more than 30 megohms at 1100° F. for cylinders as described) to be superior for spark plug use. The compositions represented by the line A—A' give maximum electrical insulation (more than 100 megohms resistance at 1100° F.), and those represented by the line B—B' give maximum thermal conductivities (less than 7.2 seconds). Accordingly, the shaded area shows a preferred series of compositions, and the lines A—A' and B—B' show compositions giving optimum characteristics in the sintered spark plug insulators.

Ceramic compositions of the invention in which component A is at least 50 per cent magnesium oxide also produce preferred insulators, although they have somewhat lower thermal conductivities than do the beryllium oxide compositions discussed above.

Still another group of preferred spark plug insulators of the invention is produced from compositions comprising from 10 to 20 per cent of alumina. Insulators made from alumina, whether or not modified by ceric oxide, have relatively lower thermal conductivity than those made from beryllia, but extremely high mechanical strength. It has been found that as much as 20 per cent of alumina (preferably 10 to 20 per cent) can be incorporated in blends sintered to produce insulators in accordance with the invention without appreciably lowering the thermal conductivities thereof, and that a substantial increase in the strength of the insulators results. However, the addition of more than about 20 per cent of alumina lowers the thermal conductivity an undesirable amount, and the lowering per increment of addition is greater as more alumina is added.

Insulators of the invention in which component B is entirely ceric oxide are also preferred.

The following examples demonstrate the suitability of various insulators for spark plug use, but are intended as illustrative only, and are not to be construed as limiting the invention:

EXAMPLE 1

Sintered ceramic insulators were prepared from different compositions; the indicated proportions of materials were wet-milled for 18 hours and were then dried and mixed with 4 per cent of paraffin wax (based upon the weight of dry ingredients, dissolved in carbon tetrachloride. The wax was thoroughly mixed with the dry ingredients, and the carbon tetrachloride volatilized, leaving the wax uniformly dispersed. Test cylinders about ½ inch in diameter and approximately ½ inch in length and 1 cm. cubes were then formed from the mixed composition using a pressure of about 10,000 pounds per square inch, and fired to cone 16 or to cone 31, as indicated.

The bodies so prepared were tested to determine their suitability for use as spark plug insulators. The electrical resistance at elevated temperatures was determined as the "Te value" of the body, which is the temperature at which a 1 cm. cube has a resistance of one megohm. Although the Te value required of insulators for spark plugs depends to a certain extent upon the design of the plug, the minimum acceptable value should be at least 1350° F. Another standard test was conducted to compare the thermal conductivities of different insulators; the test involves placing a crystal of citric acid on one end of a sintered ½ inch cylinder, and immersing the other end of the cylinder in a 600° F. metal bath to a depth of ⅛ inch. The number of seconds required for heat conducted through the insulator to melt the citric acid crystal, which melts at 307.4° F., is a measure of the thermal conductivity of the insulator. The adequacy of the firing under a set of standard conditions is also an important characteristic of a ceramic composition since it determines porosity, strength and other properties. This was measured by a standard dye test.

The effect of different proportions of ceric oxide and magnesium oxide on the characteristics of insulators is shown in Table 1, below, which gives the composition in parts, the "thermal conductivity time," measured as described above, the Te value of the insulators, and the characteristics of the firing.

Table 1

| Sample | Composition (parts) | | | | | | Conductivity Time (Seconds) Cone 16 | Te Value, °F. for cubes fired to Cone 16 | Dye Test Cone 16 | Remarks |
| --- | --- | --- | --- | --- | --- | --- | --- | --- | --- | --- |
| | MgO | CeO$_2$ | Al$_2$O$_3$ | Whiting | Talc | Bentonite | | | | |
| 1 [1] | 100 | | | | | | 12.9 | 1,650 | U. F.[3] | |
| 2 [1] | 86.9 | 9.7 | | 1.5 | 2.0 | 1.5 | 13.2 | 1,690 | Mat.[3] | |
| 3 | 70.0 | 30.0 | Trace | | | | 13.3 | 1,730 | Mat. | |
| 4 [1] | 19.3 | 77.2 | | 1.5 | 2.0 | 1.5 | 23.5 | 1,060 | Mat. | Dielectrically Unstable. |

[1] Presented for purposes of comparison; not in accord with the invention.
[2] U. F. indicates that the sample was underfired.
[3] Mat. indicates that the sample was properly matured.

EXAMPLE 2

The effect of different proportions of ceric oxide and beryllium oxide on the characteristics of insulators is shown in Table 2, below, which gives composition in parts, the "thermal conductivity time," measured as described in Example 1, the Te value of the insulators, and the characteristics of the firing.

Table 2

| Sample | Composition (parts) | | | | | | Conductivity Time (Seconds) Cone 16 | Te Value, °F. for cubes fired to Cone 16 | Dye Test Cone 16 |
| --- | --- | --- | --- | --- | --- | --- | --- | --- | --- |
| | BeO | CeO$_2$ | Al$_2$O$_3$ | Whiting | Talc | Bentonite | | | |
| 5 | 86.8 | 9.7 | Trace | 1.5 | 2.0 | 1.5 | 5.8 | 1,815 | Mat.[2] |
| 6 | 67.5 | 29.0 | Trace | 1.5 | 2.0 | 1.5 | 6.4 | 1,633 | Mat. |
| 7 | 57.9 | 38.6 | Trace | 1.5 | 2.0 | 1.5 | 6.3 | 1,570 | Mat. |
| 8 | 48.3 | 48.2 | Trace | 1.5 | 2.0 | 1.5 | 6.5 | 1,350 | Mat. |
| 9 | 38.6 | 57.9 | Trace | 1.5 | 2.0 | 1.5 | 7.1 | 1,375 | Mat. |
| 10 [1] | 19.3 | 77.2 | Trace | 1.5 | 2.0 | 1.5 | 14.6 | 950 | Mat. |

[1] Presented for purposes of comparison; not in accord with the invention.
[2] Mat. indicates that the sample was properly matured.

EXAMPLE 3

The effect of different proportions of ceric oxide together with zinc oxide-alumina, zinc oxide-beryllia, and zinc oxide-magnesia mixtures on the characteristics of insulators is shown in Table 3, below, which gives composition in parts, the "thermal conductivity time," measured as described in Example 1, the Te values of the insulators, and the characteristics of the firing.

Table 3

| Sample | ZrO$_2$ | Al$_2$O$_3$ | SnO$_2$ | MgO | CeO$_2$ | ZnO | Whiting | Talc | Bentonite | Conductivity Time (Seconds) | | Te Value for cubes fired to Cone 16 | Resistance in megohms of ½ inch cylinder at 1,100° F. | Dye Test | |
| --- | --- | --- | --- | --- | --- | --- | --- | --- | --- | --- | --- | --- | --- | --- | --- |
| | | | | | | | | | | Cone 16 | Cone 31 | | | Cone 16 | Cone 16 |
| 11 [1] | | 19.3 | | | 52.4 | 24.8 | 1.5 | 2.0 | 1.5 | 23.1 | | 965 | | Mat.[2] | |
| 12 | | Trace | 30.0 | 20.0 | 30.0 | 20.0 | 1.6 | | 1.6 | | 42.7 | | +30 | Mat. | Mat. |
| 13 | 10.0 | 10.0 | 20.0 | 20.0 | 20.0 | 20.0 | 1.6 | | 1.6 | 63.8 | | | +30 | S. U. F.[3] | |
| 14 | 20.0 | 20.0 | 20.0 | 10.0 | 20.0 | 10.0 | 1.6 | | 1.6 | 67.1 | | | +30 | S. U. F. | |

[1] Presented for purposes of comparison; not in accord with the invention.
[2] Mat. indicates that the sample was properly matured.
[3] S. U. F. indicates that the sample was slightly under fired.

Most presently used spark plug insulators are alumina bodies or bodies of the sillimanite mineral group, modified with other components. Standard additives (preferably used in compositions of the invention) are talc (maximum amount about 5.0 per cent), and whiting and bentonite (maximum amount about 5.0 per cent of each). Brucite, barium carbonate, and strontium carbonate are also used to advantage (maximum about 5.0 per cent of each).

It has long been recognized that BeO has certain properties (particularly its extremely high thermal conductivity) that suit it admirably for insulator use. However, BeO has not heretofore been available as a component for spark plug insulators as its poisonous nature militates against its use as a large proportion of the ceramic composition, and it is relatively ineffective in the proportions in which it can be used with safety with most compositions.

Oxides of calcium, zinc, strontium, cadmium, barium, silicon, titanium, germanium, zirconium, tin, and thorium are used in producing insulators of the invention (as in producing prior art insulators) principally to develop specific characteristics. Accordingly, it is preferred that these oxides constitute, combined, not more than 50 per cent of the entire composition, most desirably not more than 30 per cent. By necessity, then, it is preferred that alumina, beryllia, magnesia and ceric oxide constitute at least 50 per cent of the insulator most desirably at least 70 per cent. The usual standard additives are preferably used, and in amounts ranging from 1 per cent to 10 per cent of the total of the other constituents.

Because insulators of the invention have unusually high resistance to the corrosive action of lead resulting from the combustion of anti-detonating fuels, one embodiment of the invention involves an insulator whose core is of a standard ceramic composition, and whose surface which is exposed in the combustion chamber in use has been coated with a sintered insulating composition of the invention. Such a coating should be at least 0.001 inch thick. An insulator 10 is diagrammatically shown in Fig. 4 of the drawings as being provided with a coating 11 of a sintered insulator material of the invention.

This application is a continuation in part of my application Serial No. 32,049, filed June 9, 1948, now abandoned.

What I claim is:

1. A ceramic spark plug insulator produced by sintering a blend of refractory materials consisting essentially of a composition represented by the shaded area of Fig. 3 of the attached drawings.

2. A sintered ceramic spark plug insulator having the surface which is exposed in the combustion chamber during use coated with a thin layer of a composition as claimed in claim 1.

3. A ceramic spark plug insulator produced by sintering a substantially silica-free blend of refractory materials consisting essentially of from 10 per cent to 80 per cent of an oxide of cerium, from 20 per cent to 90 per cent of BeO, and from a trace to 20 per cent of alumina, and wherein an oxide of cerium constitutes at least 20 per cent of every blend containing not more than 80 per cent of BeO.

References Cited in the file of this patent

UNITED STATES PATENTS

| | | |
|---|---|---|
| 2,071,452 | Block | Feb. 23, 1937 |
| 2,152,655 | McDougal et al. | Apr. 4, 1939 |
| 2,174,390 | Pulfrich | Sept. 26, 1939 |
| 2,336,182 | McDougal et al. | Dec. 7, 1943 |
| 2,491,412 | Lecuir | Dec. 13, 1949 |

FOREIGN PATENTS

| | | |
|---|---|---|
| 230,445 | Great Britain | 1925 |